US010550008B2

(12) United States Patent
MacDougall et al.

(10) Patent No.: US 10,550,008 B2
(45) Date of Patent: Feb. 4, 2020

(54) LOW ENERGY FLUID PURIFICATION SYSTEM

(71) Applicant: The United States of America as represented by the Secretary of the Navy, Crane, IN (US)

(72) Inventors: Craig A MacDougall, Norco, CA (US); Dylan Switzer, Riverside, CA (US); Aaron Wiest, Norco, CA (US)

(73) Assignee: United States of American, as Represented by the Secretary of the Navy, Washington, DC (US)

(*) Notice: Subject to any disclaimer, the term of this patent is extended or adjusted under 35 U.S.C. 154(b) by 385 days.

(21) Appl. No.: 15/149,084

(22) Filed: May 7, 2016

(65) Prior Publication Data

US 2016/0376168 A1 Dec. 29, 2016

Related U.S. Application Data

(60) Provisional application No. 62/162,799, filed on May 17, 2015.

(51) Int. Cl.
*C02F 1/04* (2006.01)
*C02F 1/06* (2006.01)
*B01D 5/00* (2006.01)
*B01D 3/10* (2006.01)
(Continued)

(52) U.S. Cl.
CPC .............. *C02F 1/043* (2013.01); *B01D 3/106* (2013.01); *B01D 5/0003* (2013.01); *B01D 5/006* (2013.01); *C02F 1/046* (2013.01); *C02F 1/06* (2013.01); *C02F 1/12* (2013.01); *C02F 2103/08* (2013.01);
(Continued)

(58) Field of Classification Search
CPC .. C02F 1/04; C02F 1/043; C02F 1/046; C02F 1/12; C02F 2103/08; C02F 2301/063
See application file for complete search history.

(56) References Cited

U.S. PATENT DOCUMENTS

| 5,582,691 A | * | 12/1996 | Flynn | B01D 1/305 203/11 |
| 2006/0157335 A1 | * | 7/2006 | Levine | B01D 1/0088 202/205 |
| 2010/0050636 A1 | * | 3/2010 | Ramamurthy | C02F 1/04 60/641.7 |

FOREIGN PATENT DOCUMENTS

| FR | 2 601 353 | * | 1/1988 | ............... C02F 1/04 |
| WO | WO 2004/074187 | * | 9/2004 | ............... C02F 1/04 |

* cited by examiner

*Primary Examiner* — Renee Robinson
(74) *Attorney, Agent, or Firm* — Naval Surface Warfare Center, Crane Division

(57) ABSTRACT

A low energy fluid purification system and method of implementation including some embodiments having a vacuum-rated first chamber placed in or near a body of water with higher temperature near the surface and lower temperatures at greater depths. The vacuum-rated first chamber holds a quantity of non-potable water and a low pressure area less than or equal to the water's vapor pressure. Vaporization occurs when the higher temperature surface water is brought into contact with the low pressure area. A tubular vapor transport passage allows the vaporized water to pass to a lower temperature and lower pressure condensation chamber. The lower temperature condensation chamber is cooled by lower temperature water from a selected depth below the surface. As the temperature of the vapor lowers, the vapor will condense. This condensation is collected as a quantity of potable water. Additional embodiments and methods are also provided.

8 Claims, 10 Drawing Sheets

Profile View Low Energy Fluid Purification System Optimized For Environments With Low Thermal Gradients As A Function Of Depth

(51) Int. Cl.
*C02F 1/12* (2006.01)
*C02F 103/08* (2006.01)
(52) U.S. Cl.
CPC .... *C02F 2301/063* (2013.01); *C02F 2307/00* (2013.01)

Profile View Low Energy Fluid Purification System Optimized For Environments With Low Thermal Gradients As A Function Of Depth Vapor (saturation) pressure, kPa Salinity, g/kg

| Temp, °C | 0 | 10 | 20 | 30 | 40 | 50 | 60 | 70 | 80 | 90 | 100 | 110 | 120 |
|---|---|---|---|---|---|---|---|---|---|---|---|---|---|
| 0 | 0.611 | 0.608 | 0.604 | 0.601 | 0.597 | 0.593 | 0.590 | 0.586 | 0.582 | 0.578 | 0.575 | 0.571 | 0.567 |
| 10 | 1.228 | 1.221 | 1.214 | 1.207 | 1.199 | 1.192 | 1.185 | 1.177 | 1.170 | 1.162 | 1.154 | 1.147 | 1.139 |
| 20 | 2.339 | 2.325 | 2.312 | 2.298 | 2.284 | 2.270 | 2.256 | 2.242 | 2.228 | 2.213 | 2.199 | 2.184 | 2.169 |
| 30 | 4.247 | 4.222 | 4.197 | 4.172 | 4.147 | 4.122 | 4.096 | 4.070 | 4.044 | 4.018 | 3.992 | 3.965 | 3.938 |
| 40 | 7.384 | 7.341 | 7.298 | 7.255 | 7.211 | 7.167 | 7.123 | 7.078 | 7.033 | 6.987 | 6.941 | 6.895 | 6.848 |
| 50 | 12.351 | 12.279 | 12.207 | 12.135 | 12.062 | 11.988 | 11.914 | 11.839 | 11.763 | 11.687 | 11.610 | 11.532 | 11.454 |
| 60 | 19.946 | 19.829 | 19.713 | 19.596 | 19.478 | 19.359 | 19.239 | 19.118 | 18.996 | 18.873 | 18.749 | 18.624 | 18.497 |
| 70 | 31.201 | 31.018 | 30.837 | 30.654 | 30.470 | 30.284 | 30.096 | 29.907 | 29.716 | 29.523 | 29.329 | 29.133 | 28.935 |
| 80 | 47.415 | 47.139 | 46.863 | 46.585 | 46.305 | 46.022 | 45.737 | 45.449 | 45.159 | 44.866 | 44.571 | 44.273 | 43.972 |
| 90 | 70.182 | 69.776 | 69.368 | 68.957 | 68.542 | 68.124 | 67.701 | 67.276 | 66.846 | 66.413 | 65.975 | 65.534 | 65.089 |
| 100 | 101.418 | 100.835 | 100.245 | 99.651 | 99.052 | 98.447 | 97.837 | 97.221 | 96.601 | 95.974 | 95.343 | 94.705 | 94.062 |
| 110 | 143.376 | 142.558 | 141.725 | 140.884 | 140.037 | 139.182 | 138.320 | 137.450 | 136.572 | 135.687 | 134.793 | 133.892 | 132.982 |
| 120 | 198.665 | 197.541 | 196.386 | 195.222 | 194.048 | 192.863 | 191.668 | 190.463 | 189.246 | 188.019 | 186.782 | 185.533 | 184.272 |

Table Of Partial Vapor Pressures Of Water As A Function Of Salinity And Temperature

Fig. 3

Profile Of View Low Energy Fluid Purification System Optimized For Environments With High Thermal Gradients As A Function Of Depth Flow Chart Depicting A Method Of Utilizing The Embodiment Of The Invention Optimized For Low Thermal Gradients As A Function Of Depth As Depicted In Fig 2.

Continuation Flow Chart Depicting A Method Of Utilizing The Embodiment Of The Invention Optimized For Low Thermal Gradients As A Function Of Depth As Depicted In Fig 2.

Flow Chart Depicting A Method Of Utilizing The Embodiment Of The Invention Optimized For High Thermal Gradients As A Function Of Depth As Depicted In Fig 4.

Continuation Flow Chart Depicting A Method Of Utilizing The Embodiment Of The Invention Optimized For High Thermal Gradients As A Function Of Depth As Depicted In Fig 4.

Continuation Flow Chart Depicting A Method Of Utilizing The Embodiment Of The Invention Optimized For High Thermal Gradients As A Function Of Depth As Depicted In Fig 4.

LOW ENERGY FLUID PURIFICATION SYSTEM

CROSS-REFERENCE TO RELATED APPLICATIONS

The present application claims priority to U.S. Provisional Patent Application Ser. No. 62/162,799 filed on May 17, 2015, entitled "LOW ENERGY DESALINATION AND PURIFICATION SYSTEM," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,242) is assigned to the United States Government and is available for licensing for commercial purposes. Licensing and technical inquiries may be directed to the Technology Transfer Office, Naval Surface Warfare Center Corona.

BACKGROUND AND SUMMARY OF THE INVENTION

The present invention relates to a low energy fluid purification system. In particular, apparatus and methods are provided that allows natural temperature gradients in the ocean to be used as the heat source and sink for evaporating non-potable, e.g. saline, water under vacuum pressures and condensation of potable water. Various embodiments of the invention facilitate production of potable water with limited man-made energy input, thus minimizing the cost of the water production. Because of the vastness of the ocean, the thermal gradients represent a quasi-infinite heat source and heat sink.

Previous methods to distill ocean water have not been economically viable for multiple reasons. One major reason is for the lack of economic viability arising from a need for enormous quantities of energy required to boil and condense water. Various embodiments can utilize a way to use naturally occurring thermal gradients in the ocean to transfer the energy to and from the water thus saving the cost of having to input the energy from manmade sources. Another source of failure is unnecessary complexity. Embodiments of the invention can include designs that limit a number of valves and moving parts and uses natural pressure gradients to minimize the work required to pump water. Designing a system to maximize the work the environment does and minimize work and energy input from manmade sources decreases complexity, decreases cost, decreases maintenance and improves the chance of success.

Some background to some embodiments of the invention can include design approaches noting that a temperature at which water boils is pressure dependent (lower pressure=lower boiling temp). A pressure at which water condenses is temperature dependent (lower condensation temp=lower pressure). Temperature of water near the surface of the ocean is warmer than water deep in the ocean. One gallon of water can be boiled by inputting approximately 9,000,000 joules of energy. One gallon of water vapor can be condensed to potable water by removing approximately 9,000,000 joules of energy. Approximately 9,000,000 joules of energy is required to raise the temperature of 200 gallons of water by 2.7 degrees Celsius.

Generally, one embodiment of the invention can include a low energy fluid purification system including a first vacuum-rated chamber extending above a body of water. The evaporation chamber holds a column of water at a sufficient height so as to create a low pressure area above the column of water. Due to the low pressure, the ambient temperature of the held water is sufficient to vaporize water at an upper surface of the column of water. A gas transfer structure is coupled to the first chamber so as to convey the vaporized water away from the first chamber. A second vacuum-rated chamber is coupled to the gas transfer structure and receives the vaporized water. A condensation system is positioned within the condensation chamber configured to receive water from a depth of the body of water that is sufficiently cool to be used as a cooling fluid for the condensation system, and a condensation collection system positioned to capture condensed water produced from the condensation system. Other elements can include systems for making use of gravity or siphoning effects for transferring water within the system and a movement system.

More particularly according to one illustrative simplified embodiment of the present disclosure, some basic components of the invention can include a first-vacuum rated chamber (e.g. evaporation chamber), connected to a second vacuum-rated chamber (e.g. condensation chamber). The dual chamber system is initially evacuated of gas to create vacuum pressure whereupon the water in the evaporation chamber will begin to boil. Vapor from the evaporation chamber will move to the condensing chamber and condense. The exemplary evaporation chamber must be maintained at a higher temperature than the condensation chamber. A temperature difference will cause a pressure difference and vapor flow will not require any additional means. As water in the evaporation chamber transitions to vapor, the salinity of the water in the evaporation chamber increases and a means to exchange lower salinity ocean water for higher salinity water in the evaporation chamber is required. A means to transfer heat to the evaporation chamber is required. A system to conduct heat away from the condensing chamber is required. A system to initially evacuate gas from the two chamber system is required. A system to remove potable water from the evacuated condensing chamber is required.

Embodiments of the invention can be optimal for locations where ocean thermal gradients are not large as a function of depth. The depth vs temperature profile of such a location is depicted in FIG. 1. Note that in the example shown in FIG. 1, minimal temperature gradients are observed for the first 300 meters and a temperature drop from about 22 C to 8 C is observed between 300 and 750 meters. Other embodiments of the invention can be optimized for locations where ocean thermal gradients are large as a function of depth (i.e. a large temperature differential for little change in depth).

Various types of embodiments of the invention can be designed to be optimal for locations where ocean thermal gradients are large as a function of depth. In the previous discussion of the embodiment of the invention optimized for low thermal gradients as a function of depth (regions where large depths were required to access low temperature ocean water), the inventors relied on similar thermodynamics but a different apparatus. In the low thermal gradient embodiment, pumps were proposed to move large quantities of ocean water from large depths to achieve the required cooling. The high thermal gradient embodiment uses a passive system and relies on natural convection and ocean currents to generate the thermodynamic driving force for heat exchange.

The cross over point for efficiency of large thermal gradient system vs. the small thermal gradient can be calculated. That is, given a particular thermal gradient and corresponding depth to achieve that temperature difference one of the two systems would have a higher efficiency, due to their various designs, as illustrated in the following example: a designer can assume a 10 degree Fahrenheit temperature difference between hot and cold water is required for commercial operation of the exemplary low energy fluid purification system. Further assume that this temperature differential is achievable by using water from the surface of the ocean and water from 30 feet down in the ocean. The large thermal gradient system would require pumping each gallon of potable water from a depth of 30 feet against vacuum pressure. Pumping water against vacuum pressure adds an effective 33 feet additional height resulting in an energy input to pump 63 foot gallons of water per gallon of distilled water. The small thermal gradient system would require an additional assumption. Assume that the water used as the heat sink and heat source changed temperature by 2.7 degrees during the heat transfer processes. This would require 200 gallons of surface water and 200 gallons of deep cold water to be pumped for each gallon of distilled water produced. Further assume the siphon and vacuum assistance limited the work the pumps had to do to only 1 foot of effective pumping distance. This would result in an energy input to pump 401 foot gallons of water per gallon of distilled water. With these assumptions, the large thermal gradient system would be more efficient.

Using one change in the assumptions, the small thermal gradient system becomes more efficient. Assume the 10 F temperature gradient requires 500 feet depth water. In this scenario, the large thermal gradient system requires energy to pump 533 foot gallons of water per gallon of distilled water. The small thermal gradient system requires the same energy to pump 401 foot gallons of water per gallon of distilled water because the siphon and vacuum effects are nearly independent of depth. The current exemplary discussion has made various assumptions which may be inaccurate in some cases but a crossover point exists and will be determined by local thermal gradients, temperature change achieved in heat source and sink, and the materials used to construct the apparatus.

Initially this technology can be explored for localities where potable water is most expensive such as islands where water must be brought in by barges. Secondly the technology would be most useful for coastal communities. One bonus of the technology is that because efficiency increases with larger temperature gradients if the depth remains constant, potential global warming will improve the process by raising the temperature of the surface water of the ocean. This technology will compete with current desalination methods including reverse osmosis, and other vacuum and distillation methods.

The use of "water" to describe the fluid to be purified is not meant to restrict application to a particular fluid. Embodiments of the invention can be used to purify a liquid wherein any contaminants require a higher vaporization temperature than the liquid to be purified at a given pressure.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 3 shows a table of partial vapor pressures of water as a function of salinity and temperature.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
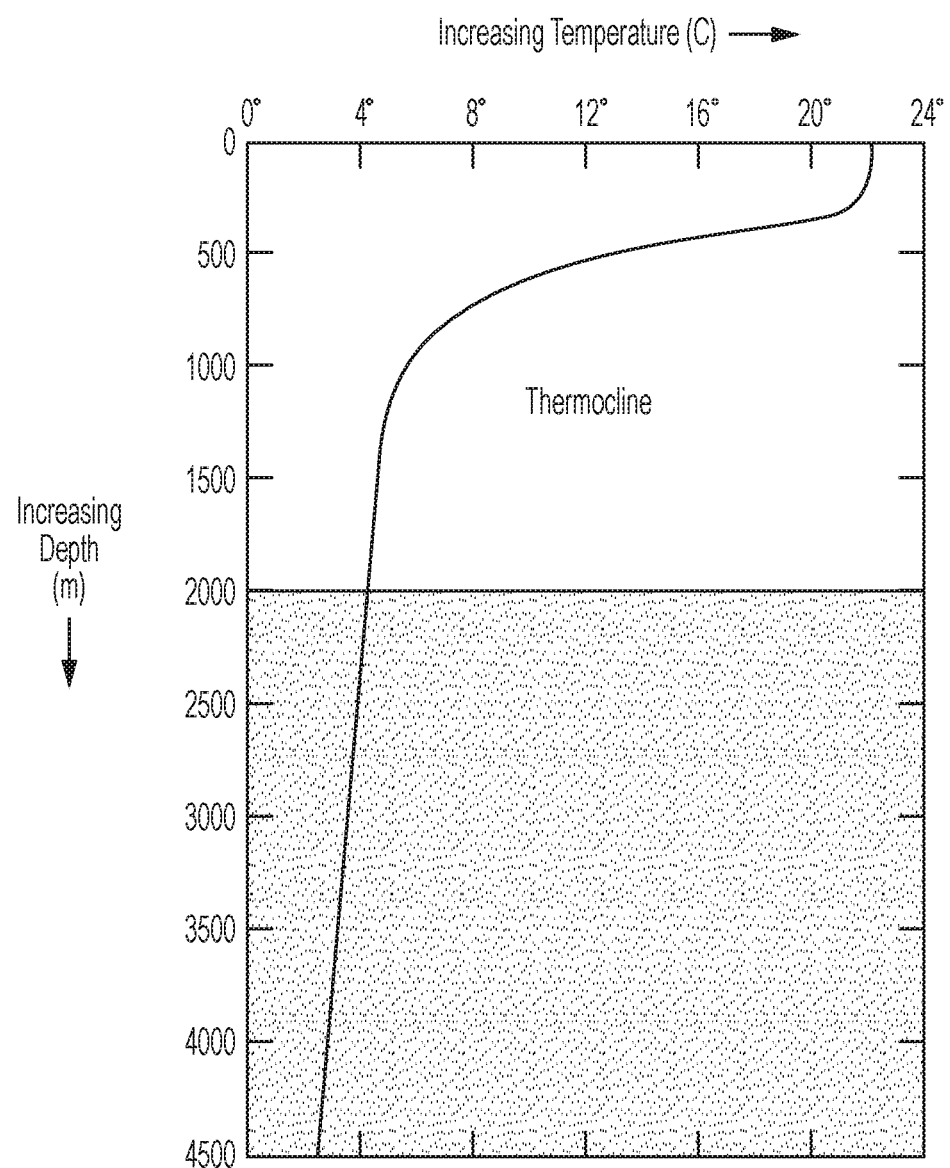
FIG. 1 shows an exemplary depth versus temperature profile for a low thermal gradient as a function of depth.
Figure 2:
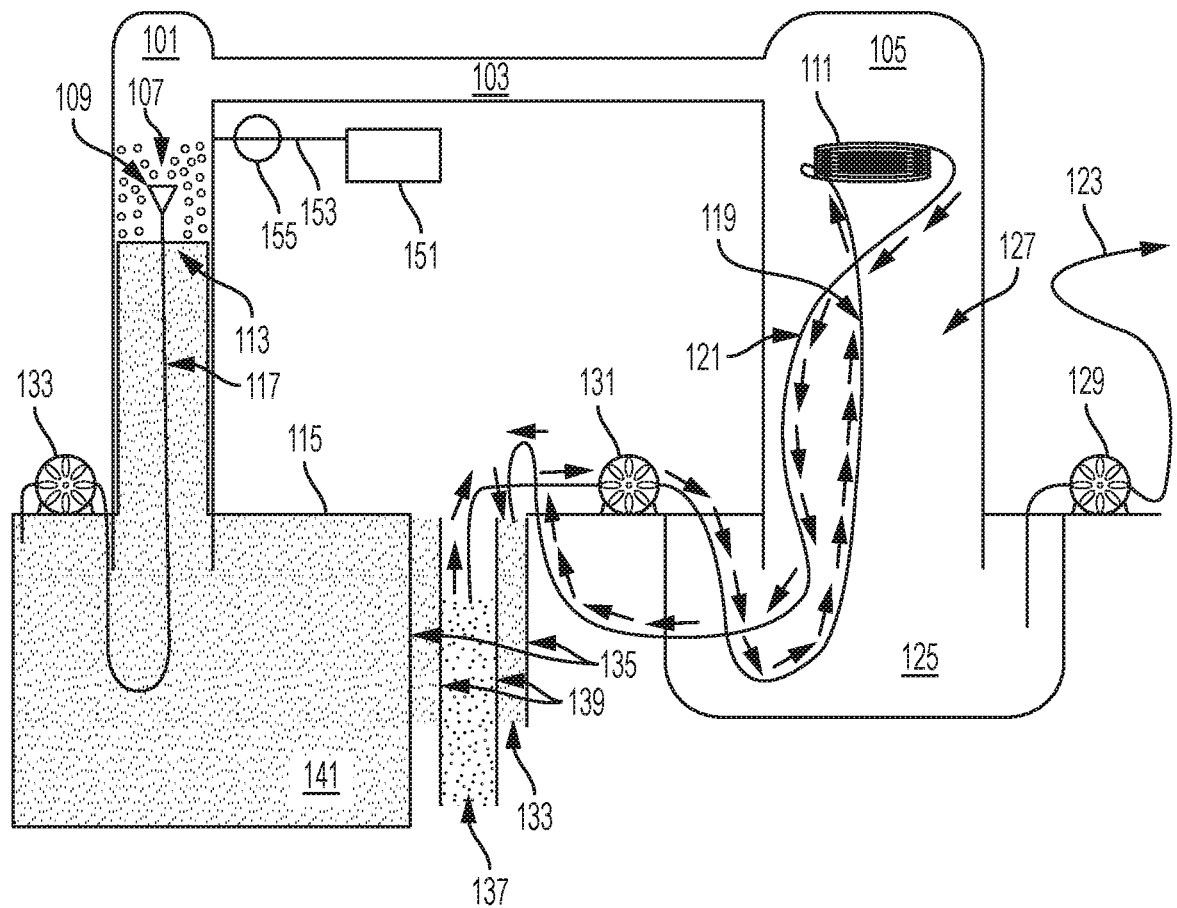
FIG. 2 shows a simplified drawing of one embodiment of the invention optimized for environments with low thermal gradients as a function of depth.

Referring initially to FIG. 2, a simplified drawing of one embodiment of the present invention is shown. A first vacuum-rated chamber 101 is connected via a vapor transfer—transfer structure 103 to a second vacuum-rated chamber 105. Chamber 101 and chamber 105 should extend more than 33 feet above the surface of a body of water 115 to be purified in at least one embodiment. The chambers 101 and 105 are constructed greater than 33 feet in height because the maximum height of an unsupported column of water under vacuum pressure is approximately 33 feet tall and a region in the first vacuum-rated chamber 101 above the unsupported 33' height waterline will be at near vacuum pressure. A support structure (not shown) can be used to support the columns that extend above or below the water. Warm water drawn from near the surface of the body of water 115 (at temperature T) is pumped up the first vacuum-rated chamber 101 using a first water pump 133 through a hose 117. The warm water is passed through an atomizing spray nozzle 109 and dispersed in droplets 107 above the 33' waterline inside a low pressure area of the first vacuum-rated chamber 101. The droplets 107 have a high surface area and are dispersed in a volume held at near vacuum pressure due to the suction and vacuum produced by the 33' water column. The droplets 107 will begin to boil and vapor will move from the first vacuum-rated chamber 101 to the second vacuum-rated chamber 105 via a vapor transfer—transfer structure 103. As the droplets 107 boil, their temperature will lower due to the laws of thermodynamics and the local temperature of water at the surface 113 of water in the first vacuum-rated chamber 101 will be some temperature lower than T. As additional water droplets 107 at temperature T are introduced into the first vacuum-rated chamber 101, a height of the water column 113 will not rise due to influence of laws of physics limiting the height of the water column to approximately 33'. Additional water must go down the column and eventually mix with the surface of the body of water 115. An additional bonus to this design is that the pump 133 pushing water from sea level into a near vacuum above a 33' tall water column 113 is assisted by the low pressure and the only work input required by the pump is that necessary to overcome flow resistance in the hose 117 and atomizing spray nozzle 109 and the extra height above 33' at which the water is released. The warm water drawn from near the surface of the body of water 115 maintains the first vacuum-rated chamber 101 at a higher partial vacuum pressure than the low temperature second vacuum-rated chamber 105. This difference in partial pressures causes water vapor to naturally move from 101 to 105 via the vapor transfer—transfer structure 103. A condenser heat exchanger 111 is placed at an upper section within the second vacuum-rated chamber 105. The condenser heat exchanger 111 may be designed like a heat exchanger radiator, a coil of metallic tubing, or other device used for heat transfer. The condenser heat exchanger 111 has circulating low temperature water 137 drawn from a selected depth calculated to provide a desired temperature difference between the second vacuum-rated chamber 105 and the first vacuum-rated chamber 101. A hollow intake structure 139 extends from near the surface of the body of water 115 to the selected depth from which the low temperature water 137 is drawn. A second water pump 131 circulates water through the condenser heat exchanger 111 by moving low temperature water 137 through a first pressure-rated hose 119; after heat is added to the water by condensing water vapor, warmer waste water is removed via a second pressure-rated hose 121. The intermediate temperature waste water 133 is still cooler than water 141 near the surface of the body of water 115 but warmer than the low temperature water 137. This intermediate temperature waste water 133 is discarded in an output structure 135 which has greater cross-sectional dimensions than the hollow intake structure 139 but does not extend as deep into the body of water as the hollow intake structure 139. An upper portion of the hollow intake structure 139 is inside the output structure 135. Discarding the intermediate temperature water in this way has multiple benefits. First, the intermediate temperature water acts to insulate the low temperature water from the warm temperature water 141. Second, because output structure 135 does not extend as deeply as the hollow intake structure 139, a low temperature water zone at the bottom of the hollow intake structure 139 is not locally mixed with the intermediate temperature waste water 133. An additional benefit of this design is that because the first pressure-rated hose 119 extends to the bottom of the hollow intake structure 139 while the second pressure-rated hose 121 only extends slightly below the surface of the body of water 115 into the top of the output structure 135, a siphon effect is set up which assists the second water pump 131 and minimizes the work required to pump water from greater depths. Water vapor that condenses on the condenser heat exchanger 111 will drop into the second vacuum-rated chamber 105 as potable water 127. In order to keep the potable water 127 separate from the non-potable warm temperature water 141, a condensation receiving vessel 125 is required. This vessel 125 must be constructed with sides high enough above the surface of the body of water 115 to not be polluted by tides or waves and can be open to atmospheric pressure as long as the second vacuum-rated chamber 105 is taller than thirty three feet. In this configuration, a third pump 129 will only require enough energy to pump water from a reservoir maintained at atmospheric pressure through hose or pipe 123 to a consumer or second storage system. Sealing the second vacuum-rated chamber 105 and the condensation receiving vessel 125 together so as to form one contiguous chamber eliminates the requirement to construct the second vacuum-rated chamber 105 taller than approximately 33 feet. However, extracting potable water from a fused (105+125) vessel will require the third pump 129 to overcome vacuum pressure. A support structure (not shown) supports the low energy fluid purification system which could be a floating derrick, a structure fixed to a seabed, supported by floats and anchored, or any other suitable support structure. A storm protection system may be affixed to the structure enabling the low energy fluid purification system to be lowered beneath the surface of the body of water 115 whenever necessary to protect the low energy fluid purification system. Power for the pumps (not shown) could be provided by solar, gasoline, etc. A propulsive means (not shown) can be added to move the Fresh Water Generator Assembly. Platforms or support structures (not shown) are required for the pumps. When employed in corrosive environments, such as oceans, components can be constructed of materials resistant to corrosion inherent in marine environments. Suitable materials include but are not limited to stainless steel, concrete, brass, monel, etc. An optional vacuum pump 151, vacuum line 153, and valve 155 are shown in case the system requires maintenance and needs to be evacuated after resealing to restart the low energy fluid purification system. Additional vacuum pumps, vacuum lines, valves and additional pumps may be added to various positions in the invention without changing the scope of the invention.

FIG. 3. depicts a table of vapor pressure as a function of temperature and salinity. As salinity increases for a fixed temperature minimal changes in vapor pressure occur. In order to boil a fluid, the partial vacuum pressure must be less than or equal to the vapor pressure of the fluid. In order to condense water, the partial vacuum pressure must be greater than or equal to the vapor pressure of the fluid. As temperature increases for a given salinity, modest changes in vapor pressure result. Higher temperature water will boil at a higher partial vacuum pressure (higher vapor pressure) in the first vacuum-rated chamber 101. Lower temperature water can be used to condense the vapor in the second vacuum-rated chamber 105 and will result in a lower partial vacuum pressure (lower vapor pressure). The differences in partial vacuum pressures will cause vapor to move from the (higher partial pressure) first vacuum-rated chamber 101 to the (lower partial pressure) second vacuum-rated chamber 105 via the vapor transfer—transfer structure 103 without additional energy input.

Figure 4:
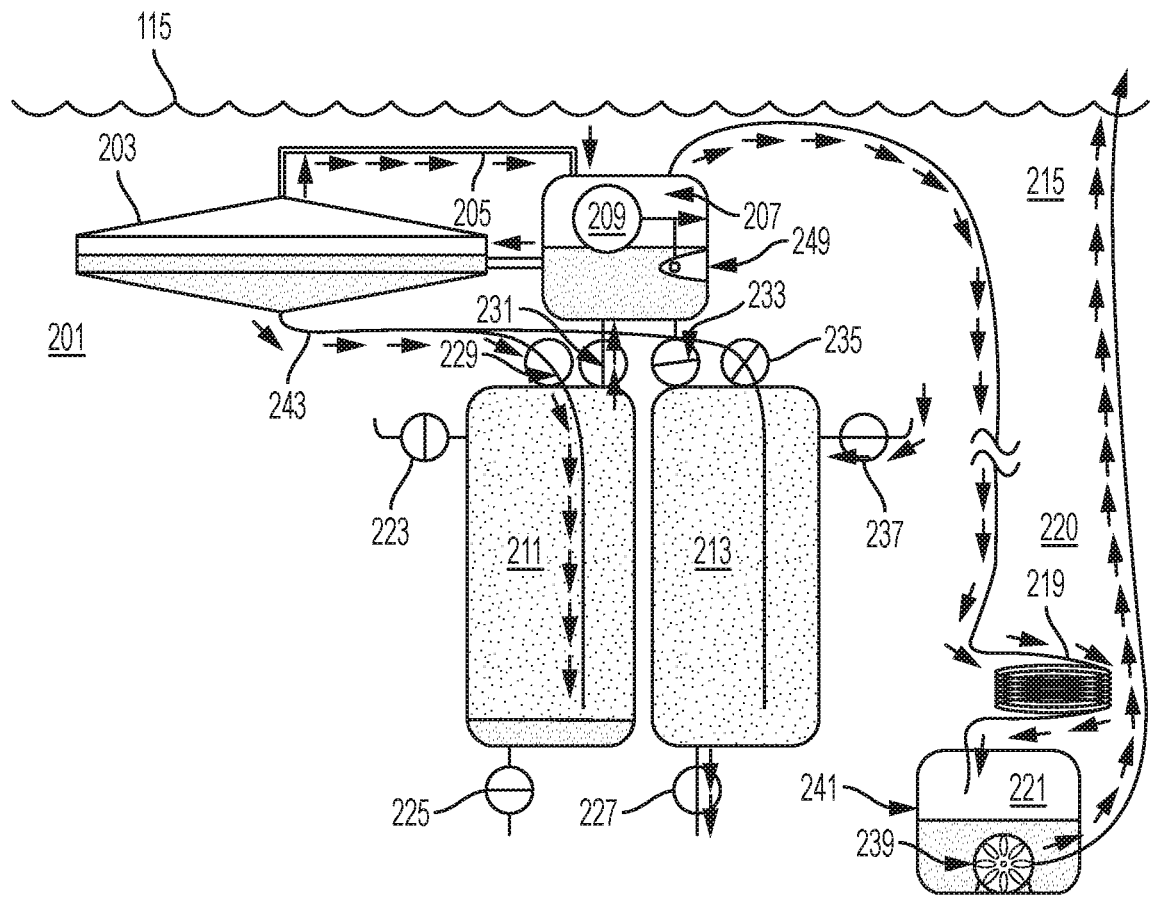
FIG. 4 shows a simplified drawing of another embodiment of the invention.

FIG. 4. depicts another embodiment of the present invention: An embodiment of the invention is submerged beneath the surface of the body of water 115. Though saline is used in this description, the application of the present disclosure is not limited to salt water. A boiler-heat exchanger 203 is configured in a manner that maximizes surface area so as to allow heat from the surrounding water in which it is submerged, to flow into a quantity of saline water contained therein. The flow of heat from the surrounding water into the boiler-heat exchanger 203 maintains the temperature of the contained water as the contained water also boils. The boiler-heat exchanger 203 is supported by a structure (not shown) or buoyancy or a combination of the two, at a depth chosen for its ability to supply heat as well as to satisfy other system integrity and maintainability requirements. As salinity in the boiler-heat exchanger 203 increases during boiling, the remaining saline water's density will increase and the denser brine will sink to the lowest spot in the boiler-heat exchanger 203 and flow out through vacuum-rated tubing 243 into a first storage tank 211 in feed mode through an open valve 229. The boiler-heat exchanger 203 is constructed to facilitate the draining of this briny water by configuring the lower surface of the boiler-heat exchanger with an exit port located at its lowest point. The briny water entering the first storage tank 211 in feed mode will displace an equivalent volume of lower salinity water in the first storage tank 211 which will be forced up through an open valve 231 into the vacuum-rated manifold chamber 207. The lower salinity water entering the vacuum-rated manifold chamber 207 will displace an equal volume of water which will flow into the boiler-heat exchanger 203. This flow of saline water through the system provides longer cycle times before purging briny water back into the ocean without requiring active pumping. The resulting water vapor from the boiler-heat exchanger 203 moves into the vacuum-rated manifold chamber 207 through vacuum-rated tubing 205.

Maximizing surface area of the boiler-heat exchanger 203 could involve constructing boiler-heat exchanger 203 as a large diameter/perimeter, cylinder or parallelepiped, by using a commercially available radiator or heat exchanger, or by other methods. Constructing the boiler-heat exchanger with a minimal height avoids contact between the heat exchanger and colder water found at depth; it also facilitates greater efficiency in heat exchange with convective currents in the surrounding ocean. A vacuum pump (not shown) is coupled to the boiler-heat exchanger 203 and serves to establish vacuum pressure in the system. A vacuum-rated manifold chamber 207 is coupled to the boiler-heat exchanger 203 and is used to modulate the flow of non-potable water into the boiler-heat exchanger 203 and to introduce outside non-potable water into the system to replace the fresh water leaving the system through vacuum-rated tubing 215.

As a portion of water held within the boiler-heat exchanger 203 is reduced due to its vaporization, the water to be purified moves from the vacuum-rated manifold chamber 207 into the boiler-heat exchanger 203 until the level of water in the manifold chamber 207 falls below a selected point that causes a regulating valve 249 to open and allow warm water to enter the manifold chamber 207. Within the figure, an internal float 209 actuates the valve as the liquid level in the manifold chamber falls below a desired level. This configuration is not meant to restrict the manner in which a valve could be actuated to allow outside water into the system. The salinity of the water in the boiler-heat exchanger 203 will increase as water vapor moves to the other parts of the apparatus. The first storage tank 211 is coupled to an input port of the vacuum-rated manifold chamber 207 and to an output port of the boiler-heat exchanger 203 via valves 229 and 231. Valves 223 and 225 are coupled to the first storage tank 211 and may be used to isolate the first storage tank 211 from first section-higher temperature water 201 such that the vacuum in the system is maintained. A second storage tank 213 is coupled to an input port of the vacuum-rated manifold chamber 207 and to an output port of the boiler-heat exchanger 203 via valves 233 and 235. Valves 227 and 237 are coupled to the second storage tank 213 and may be used to isolate the second storage tank 213 from first section-higher temperature water 201. In the drawing, valves 223, 225, 229, 231 are configured to use the first storage tank 211 for water exchange occurring in an application where the present invention is being employed to desalinate water.

Because this is a closed system, eventually the salinity of 211+207+203 will reach a point where efficiency is diminished. The time it will take for this to occur depends mainly on the size of the first storage tank 211. However, the tank can be switched from feed mode to exchange mode and continue to maintain the required vacuum in the system by closing the open valves 229 and 231, and then opening the other valves 223 and 225. A mechanism to ensure neither valves 225 nor 223 are open at the same time either valve 229 or 231 are open is not shown but could be affected by one of several means and would be an important fail-safe mechanism to employ. When the first storage tank 211 switches from feed mode to exchange mode, by adjusting the various required valves as above, the internal pressure of the tank will change from near vacuum to something approximating 1 atmosphere. This change of internal pressure will cause the tank to flex and the tank will expand. Care should be taken to construct the storage tanks 211 and 213 to minimize flexing due to changes in internal pressure as they switch from one mode to the other because this flexing represents energy lost from the system and will reduce efficiency.

To convert the second storage tank 213 from the depicted exchange mode to feed mode and continue to maintain the required vacuum in the system valves 227, and 237 should be closed and then valves 233, and 235 should be opened. A fail-safe mechanism to prevent valve configurations which destroy the vacuum should also be employed on the second storage tank 213. It is instructive to examine the second storage tank 213 in exchange mode with valves 227, 233, 235, 237 in the positions drawn. Valve 237 is located near the top of the tank to allow lower salinity warm water to enter and replace the higher salinity water leaving the tank through valve 227 which is located at the bottom of the tank. The position of the valves allows exchange of the tank's water without active pumping by taking advantage of the difference in densities of the water inside the tank versus outside the tank. Having two or more tanks like 211 and 213 allows the system to be operated continuously with maximum efficiency.

As water from the boiler-heat exchanger 203 boils in the partial vacuum, water vapor moves from the boiler-heat exchanger 203 to the vacuum-rated manifold chamber 207 via a hollow vapor transport structure 205. A vacuum rated hose 215 is coupled on one end to the vacuum-rated manifold chamber 207 and on an opposite end to a condenser-heat exchanger 219. The condenser-heat exchanger 219 is configured to be disposed at a selected depth within a second section of water 220 having a lower temperature. Due to lower partial vacuum developed within the condenser-heat exchanger 219, vapor at the first section of water's temperature will continue from the vacuum-rated manifold chamber 207 to the condenser-heat exchanger 219 where the condenser-heat exchanger's 219 disposition within the second section lower temperature water allows heat to pass from within the condenser-heat exchanger 219 to the surrounding water. Due to the resultant cooling, the vapor condenses to distilled water droplets 221 and falls into a potable water storage tank 241. The distilled water is moved to the consumer by a pump 239. There are many additional components required to manage salinity, and move water. This invention is optimized for areas of the ocean with large thermal gradients over small changes in depth because repair and extraction of water from large depths can quickly become energy intensive and economically non-viable. As water vapor enters the condenser, heat will be extracted by the low temperature water deep in the ocean. A support structure (not shown) supports the low energy fluid purification system which could be a floating derrick, a structure fixed to a seabed, supported by floats and anchored, etc. Pipes and chambers and tubes could be constructed of materials resistant to corrosion inherent in marine environments. Suitable materials include but are not limited to stainless steel, concrete, brass, monel, etc.

Figure 5A:
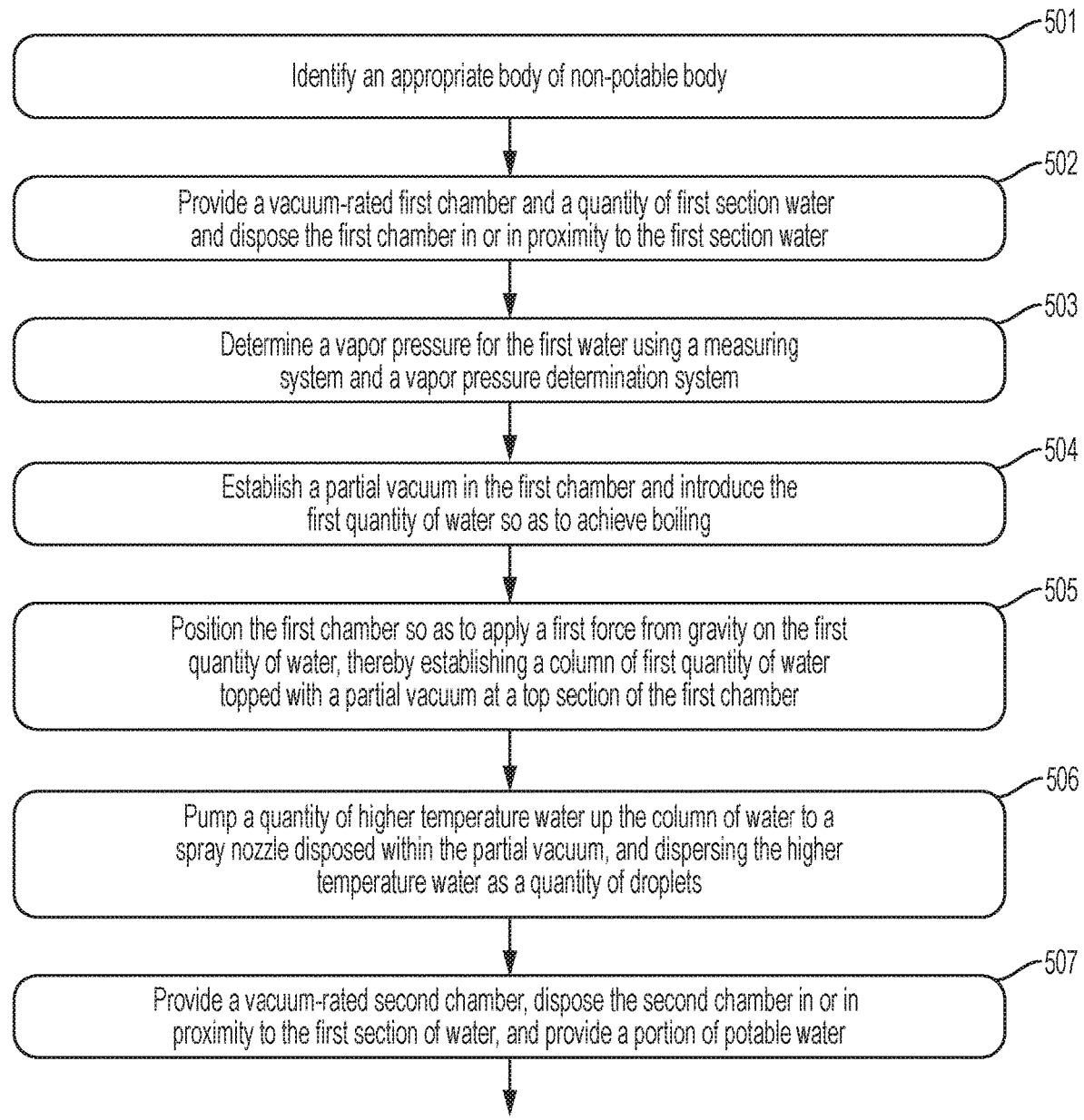
FIGS. 5A, 5B and 5C depict a method of utilizing the embodiment of the invention optimized for low thermal gradients as a function of depth as depicted in FIG. 2.
Figure 5B:
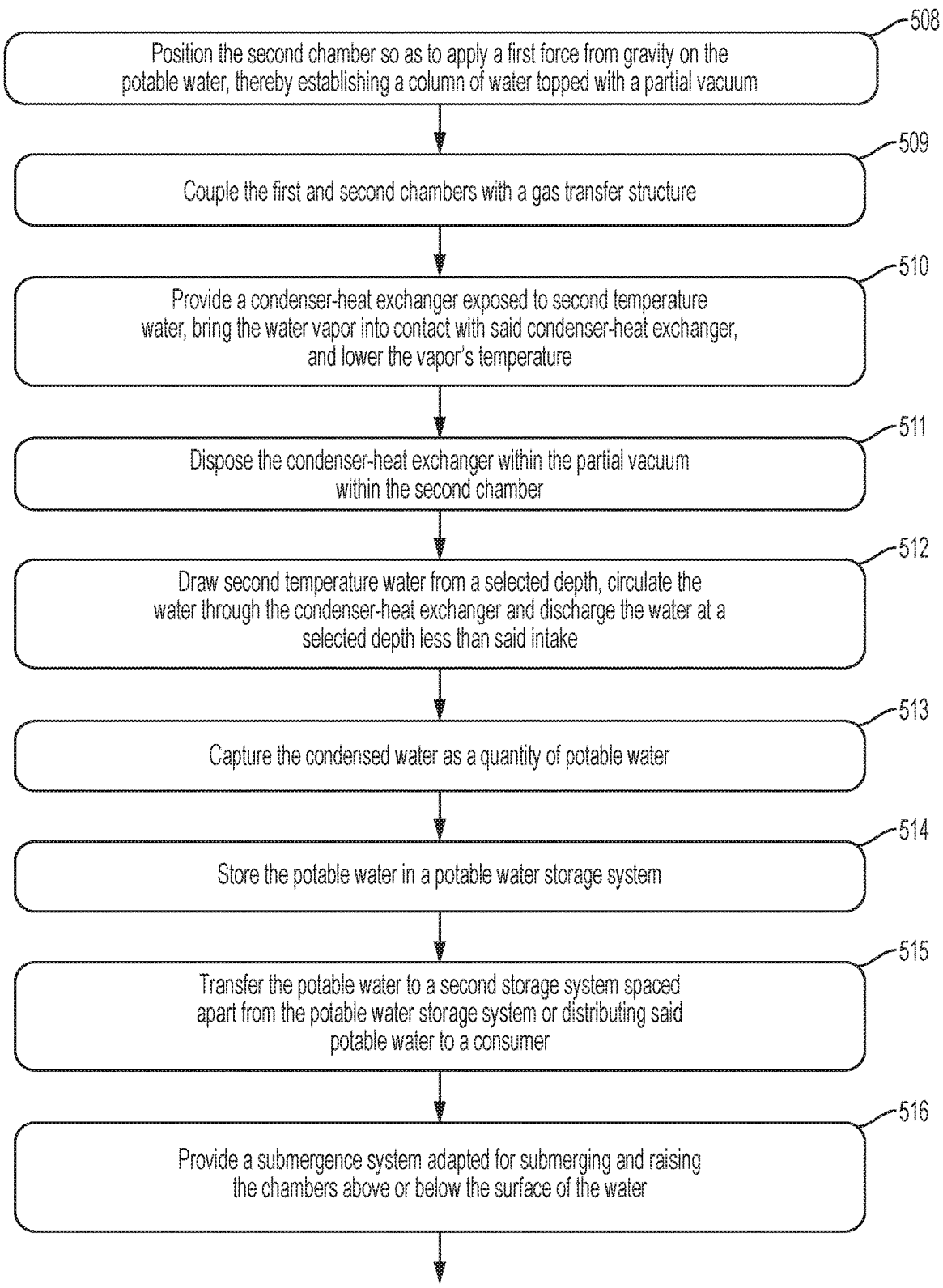
Figure 5C:
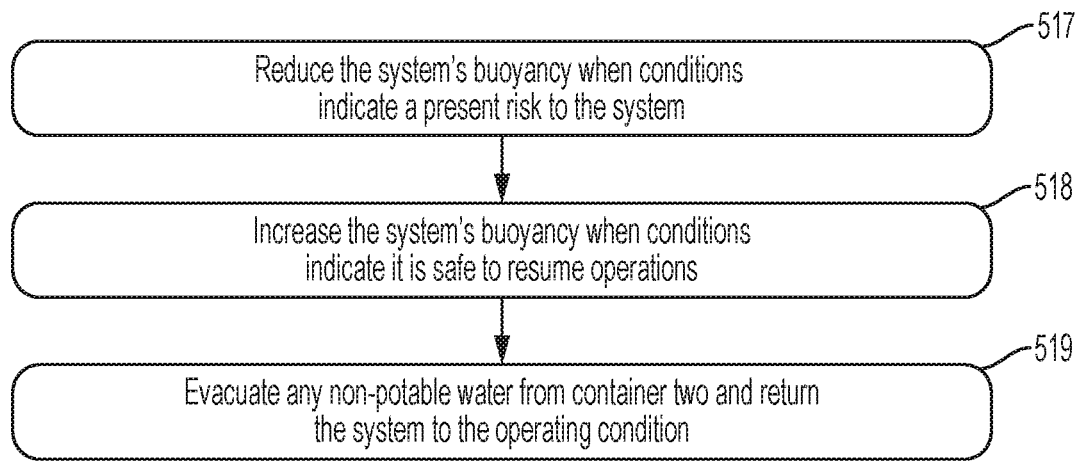

FIGS. 5A, 5B and 5C. depict a method of utilizing the embodiment of the invention optimized for low thermal gradients as a function of depth as depicted in FIG. 2.

FIG. 5A specifically shows: step 501 involves identifying a non-potable body of water having temperatures decreasing with depth comprising a first section of water having a first or higher temperature near an upper surface and a second section of water underneath said first section with a second or lower temperature that is at least a condensation temperature required to condense water from water vapor at said first or higher temperature; step 502 involves providing a vacuum-rated first chamber and a quantity of said first section of water and disposing said first chamber in or in proximity to said first section of water; step 503 involves determining a vapor pressure for said first water using a measuring system and a vapor pressure determination system; step 504 involves establishing a partial vacuum in said first chamber less than or equal to the vapor pressure of said first quantity of water in said first chamber, and introducing said first quantity of water at said first temperature to said partial vacuum so as to achieve boiling of said quantity of water, resulting in a quantity of water vapor; step 505 involves raising said first chamber from a first elevation to a second elevation thereby establishing said partial vacuum by positioning said first chamber to apply a first force from gravity on said first quantity of water and thereby establishing a column of said first quantity of water topped with a partial vacuum at a top section of said first chamber less than or equal to the vapor pressure of the said first quantity of water in said first chamber; step 506 involves providing a pump to transport a quantity of said first section-higher temperature water up said column of said first quantity of water to a spray nozzle disposed within said partial vacuum, and dispersing said quantity of said first section-higher temperature water as a quantity of droplets within said partial vacuum; step 507 involves providing a vacuum-rated second chamber, disposing said second chamber in or in proximity to said first section of water, and providing a portion of potable water;

FIG. 5B specifically shows: step 508 involves positioning said second chamber and disposing said portion of potable water into said second chamber to apply a first force from gravity on said portion of said potable water and thereby establishing a column of potable water topped with a partial vacuum at a top section of said second chamber greater than or equal to the vapor pressure of the potable water in said second chamber; step 509 involves coupling said first and second chambers with a gas transfer structure adapted to transfer said water vapor within said first chamber to said second chamber; and step 510 involves providing a condenser-heat exchanger exposed to said second temperature water; transporting said pure water vapor away from said first container by a pressure differential and into contact with said condenser-heat exchanger; and employing said condenser-heat exchanger to lower said vapor's temperature and pressure sufficiently to create said pressure differential and achieve condensation so as to produce condensed water; step 511 involves disposing said condenser-heat exchanger within said partial vacuum within said second chamber; step 512 involves exposing said condenser-heat exchanger to said second temperature water by providing a pump to draw said second temperature water from a selected depth, and piping to carry said second temperature water from an intake at said depth, through said condenser-heat exchanger and discharging at a selected depth less than said intake, a portion of said piping designated for discharge being a larger diameter than a portion of said piping designated for intake, said intake portion being disposed within said larger discharge portion but extending to a greater depth then said discharge portion; step 513 involves capturing said condensed water resulting in a quantity of potable water; step 514 involves storing said condensed water as potable water in a potable water storage system; step 515 involves transferring said potable water to a second storage system spaced apart from said potable water storage system or distributing said potable water to a consumer; step 516 involves providing a storm protection system including a submergence system comprising a support structure, a control system, motors, pumps, buoyancy tanks and an anchoring system, wherein said buoyancy tanks are coupled with said first and second chamber, said submergence system is adapted for submerging and raising said first and second chambers above or below said non-potable body of water;

FIG. 5C specifically shows: step 517 involves reducing said submergence system's buoyancy when conditions at or above said surface of body of non-potable water indicate a present risk to said structure and coupled low energy fluid purification system; step 518 involves increasing said submergence system's buoyancy when conditions at or above said surface of body of non-potable water indicate conditions are within selected operating limits for said low energy fluid purification system; step 519 involves evacuating any non-potable water from said container two and returning said low energy fluid purification system to a selected operating condition.

Figure 6A:
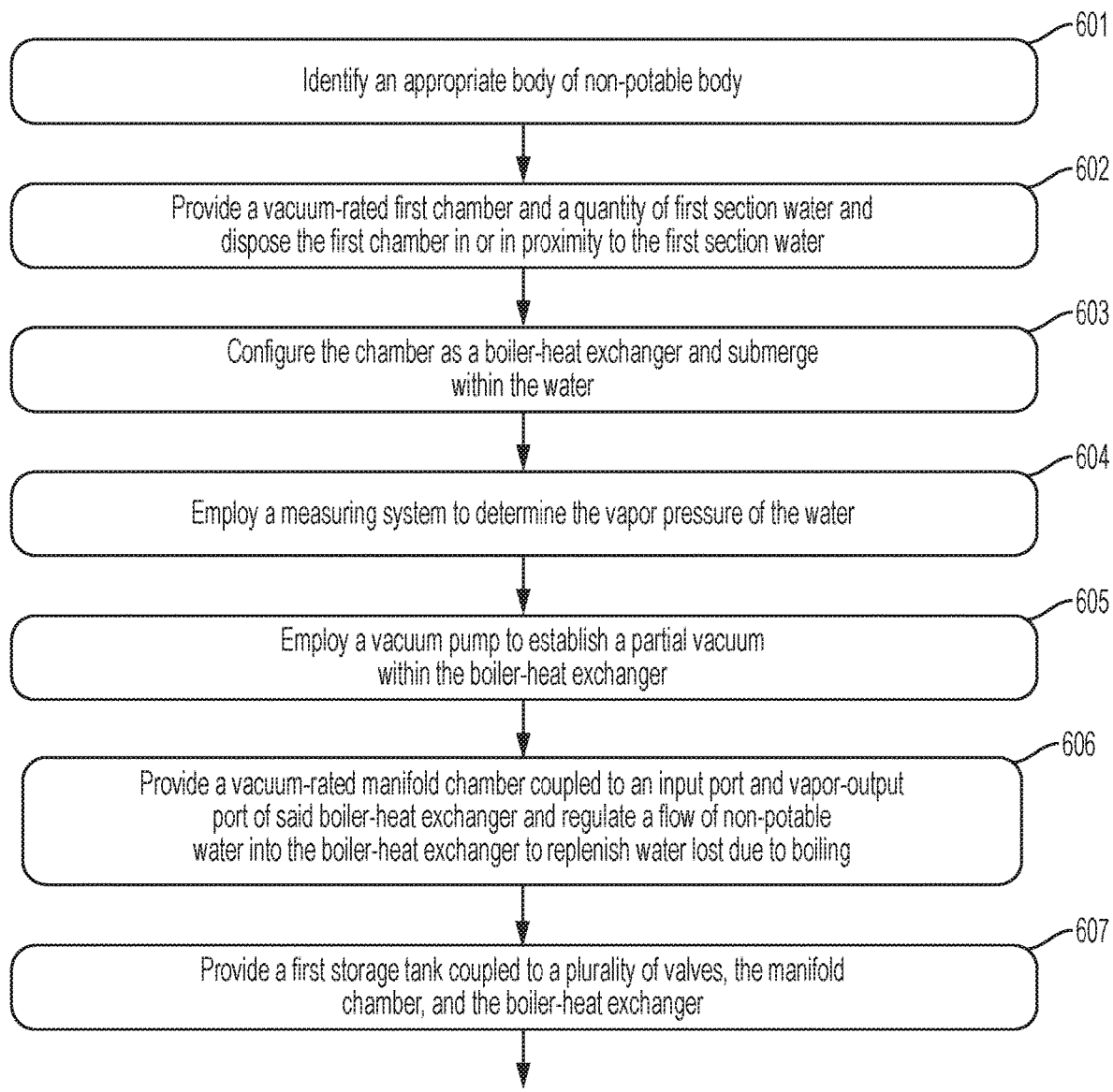
FIGS. 6A, 6B and 6C depict a method of utilizing the embodiment of the invention optimized for high thermal gradients as a function of depth as depicted in FIG. 4.
Figure 6B:
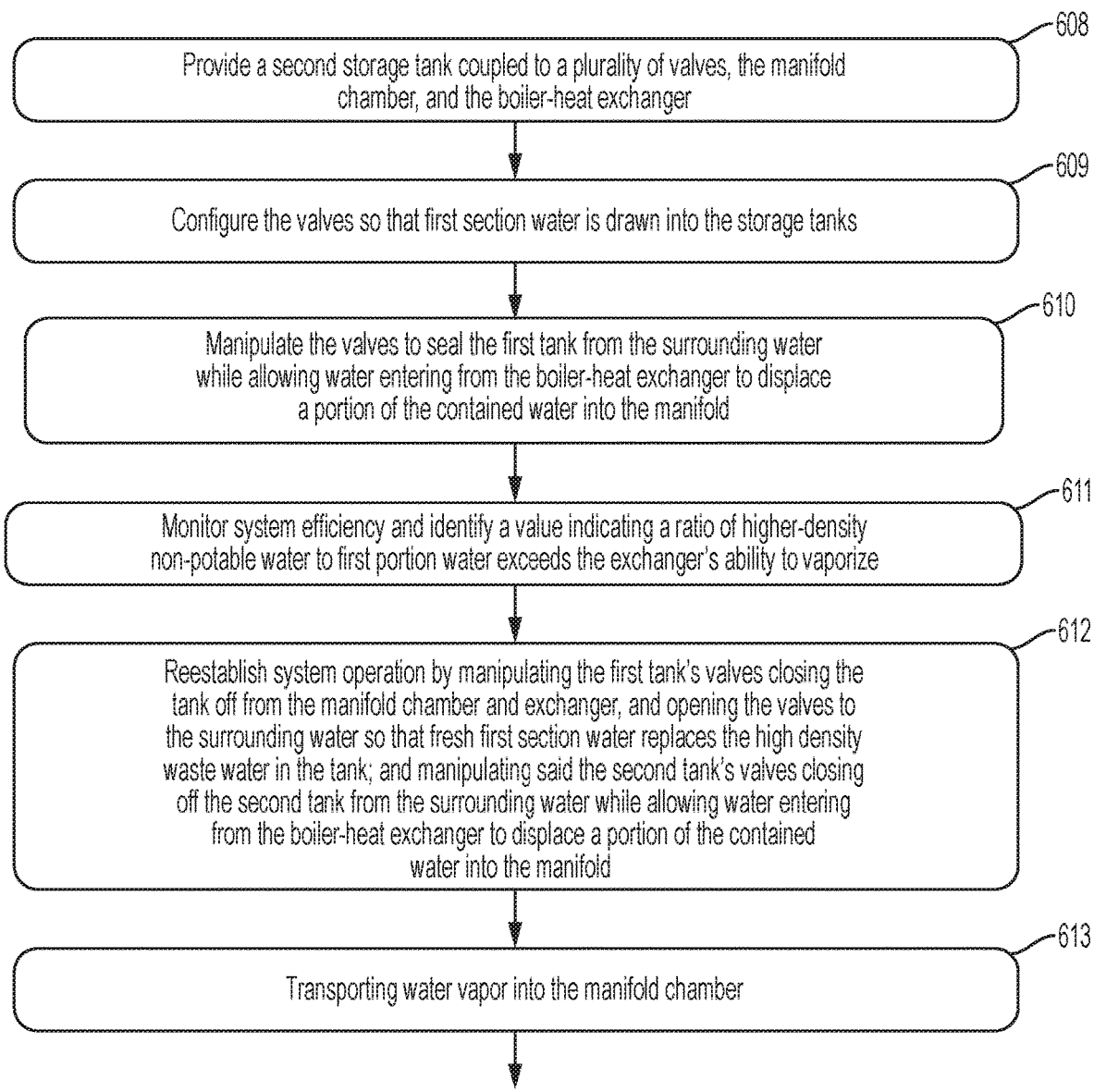
Figure 6C:
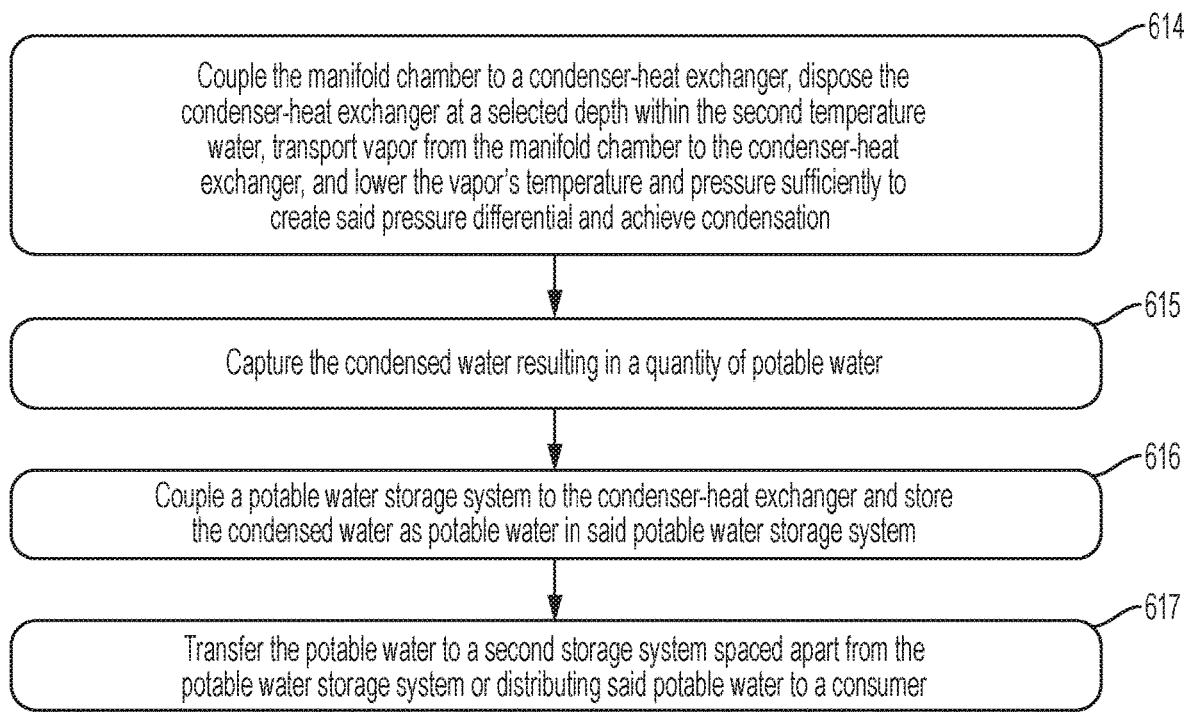

FIGS. 6A, 6B and 6C depict a method of utilizing the embodiment of the invention optimized for high thermal gradients as a function of depth as depicted in FIG. 4.

FIG. 6A specifically shows: step 601 involves identifying a non-potable body of water having temperatures decreasing with depth comprising a first section of water having a first or higher temperature near an upper surface and a second section of water underneath said first section a with a second or lower temperature that is at least a condensation temperature required to condense water from water vapor at said first or higher temperature; step 602 involves providing a vacuum-rated first chamber and a quantity of said first section of water and disposing said first chamber in or in proximity to said first section of water; step 603 involves configuring said first vacuum rated chamber as a boiler-heat exchanger that maximizes surface area to allow heat from first section-higher temperature water to enter said low energy fluid purification system, and disposing said first chamber within said first section-higher temperature water; step 604 involves determining a vapor pressure for said first water using a measuring system and a vapor pressure determination system; step 605 involves providing a vacuum pump, vacuum line and valve; coupling said vacuum pump, vacuum line and valve to said boiler-heat exchanger; and establishing a partial vacuum in said first chamber less than or equal to the vapor pressure of said first quantity of water in said first chamber, and introducing said first quantity of water at said first temperature to said partial vacuum so as to achieve boiling of said quantity of water, resulting in a quantity of water vapor; step 606 involves providing a vacuum-rated manifold chamber, disposing said manifold chamber below said first section of water, and coupling said manifold chamber to an input port of said boiler-heat exchanger and to a vapor-output port of said boiler-heat exchanger; and regulating a flow of non-potable water into said boiler-heat exchanger to replenish water lost due to boiling and conversion to vapor; step 607 involves providing a first storage tank coupled to a first plurality of valves, an input port on said manifold chamber, and a non-potable water output port on said boiler-heat exchanger;

FIG. 6B specifically shows: step 608 involves providing a second storage tank coupled to a second plurality of valves, an input port on said manifold chamber, and a non-potable water output port on said boiler-heat exchanger; step 609 involves configuring said pluralities of valves so that a first portion of said first section of water is drawn into said first storage tank and a second portion of said first section of water is drawn into said second storage tank; step 610 involves manipulating said first plurality of valves closing off said first storage tank from said first section of water while allowing said first portion of first section of water to enter said manifold chamber as said portion of first section of water is forced out of said first storage tank by an equal portion of higher-density, non-potable water entering said first storage tank from said boiler-heat exchanger; step 611 involves monitoring system efficiency using a measuring system and efficiency determination system and identifying a value indicating a ratio of said higher-density, non-potable water to said first portion water in a water mixture exceeds said boiler-heat exchanger's ability to vaporize said mixture; step 612 involves reestablishing system operation by manipulating said first plurality of valves closing off said first storage tank from said manifold chamber and said boiler-heat exchanger, and opening said first storage tank to said first section of water allowing said first section of water to replace said mixture; and manipulating said second plurality of valves closing off said second storage tank from said first section of water while allowing said second portion of first section of water to enter said manifold chamber as said second portion of water is forced out of said second storage tank by an equal portion of higher-density, non-potable water entering said second storage tank from said boiler-heat exchanger; step 613 involves transporting said water vapor away from said boiler-heat exchanger into said manifold chamber;

FIG. 6C specifically shows: step 614 involves providing a vacuum-rated hose, coupling said manifold chamber to a condenser-heat exchanger with said vacuum-rated hose, disposing said condenser-heat exchanger at a selected depth within said second temperature second section of water, and transporting said water vapor from said manifold chamber to said condenser-heat exchanger within said vacuum-rated hose by a pressure differential and into contact with said condenser-heat exchanger; and employing said condenser-heat exchanger to lower said vapor's temperature and pressure sufficiently to create said pressure differential and achieve condensation so as to produce condensed water; step 615 involves capturing said condensed water resulting in a quantity of potable water; step 616 involves coupling a potable water storage system to said condenser-heat exchanger and storing said condensed water as potable water in said potable water storage system; step 617 involves transferring said potable water to a second storage system spaced apart from said potable water storage system or distributing said potable water to a consumer.

The invention claimed is:

1. A method for purifying or desalinating water utilizing temperature gradients, comprising the steps of:
identifying a non-potable body of water having temperatures decreasing with depth comprising a first section of water having a first or higher temperature near an upper surface and a second section of water underneath said first section of water with a second or lower temperature that is at least a condensation temperature required to condense water from water vapor at said first or higher temperature;
providing a vacuum-rated first chamber with a first and second end, wherein the first end is a closed end and the second end forms a first chamber aperture with an open end oriented and disposed towards the non-potable body of water in an installed orientation and disposing or lowering said open end of the first chamber in said first section of water such that the open end of the first chamber is submerged in and encloses a portion of the first section of the non-potable body of water;
determining a first vapor pressure for said first section of water;
establishing a first partial vacuum in said first chamber less than or equal to a first vapor pressure of said portion of the first section of water in said first chamber, and exposing said portion of the first section of water at a first temperature to said first partial vacuum within said first chamber so as to achieve boiling of said first quantity of water, resulting in a quantity of water vapor, wherein said first partial vacuum is established by positioning said first chamber to apply a first force from gravity on said portion of the first section of water within said vacuum-rated first chamber and thereby elevating a first column or elevated quantity of at least said portion of the first section of water and additional water drawn from said first section of water that is topped with said first partial vacuum at an upper internal section of said first chamber less than or equal to the vapor pressure of first section water disposed in said first chamber;
providing a vacuum pump and valve and coupling the vacuum pump with the first chamber at a position above the first column of said portion of the first section of water;
providing a first intake pipe or conduit and a first pump coupled to the first intake pipe or conduit;
disposing an end of the first intake pipe or conduit into said first section of higher temperature water;
pumping, using the first intake pipe and first pump, said first section-higher temperature water above said first column of said portion of the first section of water to a spray nozzle disposed within said first chamber having the first partial vacuum, and dispersing said first section-higher temperature water as droplets;
providing a vacuum-rated second chamber comprising a first and second end and disposing said second chamber in proximity to said first chamber, wherein the first end of the second chamber is enclosed and the second end is formed with a second chamber aperture;
providing a capture container formed with a floor and enclosing walls coupled with the floor, the enclosing walls defining a first aperture;
disposing the second end of the second chamber within the capture container so that ends of the second end extend a first distance into the capture container;
disposing a first quantity of potable water into said second chamber and said capture container such that the second end of the second chamber is submerged within the first quantity of potable water;
raising the second chamber with respect to the capture container with the first quantity of potable water so as to apply the first force from gravity on said first quantity of potable water within the second chamber while maintaining the second end of the second chamber as submerged within the first quantity of potable water and thereby creating an elevated column of said first quantity of potable water within the second chamber topped with a second partial vacuum at a top internal section of said second chamber greater than or equal to the vapor pressure of at least the first quantity of potable water in said second chamber;

coupling said first and second chambers with a water vapor transfer structure adapted to enable transfer at least a portion of the water vapor originating within said first chamber to said second chamber;

providing a second intake pipe or conduit and disposing one end of the second intake pipe or conduit into said second section of water;

providing a second pump coupled with the second intake pipe or conduct on an opposing end of the second intake pipe or conduct that is disposed in said second section of water;

providing a condenser-heat exchanger and a discharge pipe, wherein the condenser-heat exchanger is disposed within said second chamber, the condenser-heat exchanger is fluidly coupled with the second pump which is fluidly coupled with a proximal end of the second intake pipe or conduit, wherein the condenser-heat exchanger, said second intake pipe or conduit, and said discharge pipe is configured for receiving said second temperature water by using the second pump to draw said second temperature water through said condenser-heat exchanger and discharging at a depth less than a distal end of the second intake or conduit but more than a distal end of the first intake pipe or conduit, wherein the discharge pipe is formed having a larger diameter than the second intake pipe or conduit, wherein the second intake pipe or conduit is disposed within at least a portion of the discharge pipe and having a discharge output section that discharges said second temperature water at said depth between distal ends of the first and second intake pipes or conduits;

operating the vacuum pump to establish or maintain a first chamber initial operating condition comprising said first partial vacuum;

transporting the water vapor away from the first chamber by operating the second pump and passing the second temperature water through the condenser-heat exchanger to condense said water vapor into condensed water on surfaces of the heat-condenser and thereby also create a pressure differential between the first and second chambers as a result of conversion of the water vapor into the condensed water which mixes with the potable water previously disposed in the capture container;

capturing said condensed water in said second chamber and said capture container; and storing at least some of said condensed water in a potable water storage system.

2. A method as in claim 1, wherein the positioning of said first and second chambers comprises raising said first and second chambers from a first elevation to a second elevation whereby said first portion of said first section quantity of water and said first quantity of potable water are in unsupported columns and thereby drop from the upper sections of said first and second chambers and thereby respectively create the first partial vacuum between an upper surface of the non-potable first portion of said first section's water column and an upper end section of said first chamber as well as creating said second partial vacuum between an upper surface of said first quantity of potable water column and an internal end section of said second chamber.

3. A method as in claim 2, further comprising transferring at least said condensed water or a mixture of said first quantity of potable water and said condensed water to a second storage system spaced apart from said potable water storage system or outputting said condensed water or a mixture of said condensed water with said first quantity of potable water from the the capture container.

4. A method as in claim 2, further comprising:
providing a submergence system comprising a support structure, a control system, motors, pumps, buoyancy tanks and an anchoring system, wherein said support structure and buoyancy tanks are coupled with said first and second chamber, said submergence system is adapted for submerging and raising at least a portion of said first and second chambers above or below said non-potable body of water; and operating the submergence system thereby reducing said submergence system's buoyancy and lowering the support structure with said first and second chambers into the non-potable body of water.

5. A method as in claim 4, further comprising transferring at least said condensed water or a mixture of said condensed water with said potable water to a second storage system spaced apart from said potable water storage system or distributing said potable water from said capture container.

6. A method for purifying or desalinating, water utilizing temperature gradients, comprising the steps of:

identifying a non-potable body of water having temperatures decreasing with depth comprising a first section of water having a first or higher temperature near an upper surface and a second section of water underneath said first section of water with a second or lower temperature;

providing a system for purifying or desalinating non-potable body of water in said first section water comprising:

a first vacuum-rated chamber, hereinafter first chamber, formed with a first chamber top section, a first chamber bottom section, and a first chamber sidewall section that surrounds a first chamber cavity, wherein said first vacuum-rated chamber is formed as a boiler-heat exchanger, wherein said first chamber further comprises a boiler chamber liquid input port formed into or through a section of said first chamber sidewall, a boiler chamber water vapor-output port disposed in said first chamber top section, and a boiler chamber waste water output port disposed in said bottom section, wherein the first chamber is configured in a manner that maximizes surface area to allow heat from said first section-higher temperature water to transfer said heat to the first chamber from a quantity of said first section water, wherein said top chamber section and said bottom chamber section are formed with an angled shape that has a peak at a center section of each said first chamber top section and said first chamber bottom section so that the first chamber's center of buoyancy is above its center of mass when said first section water is disposed within the first chamber so that the first chamber maintains a predetermined orientation;

a first conduit, a first water vapor conduit, a second water vapor conduit;

a condenser-heat exchanger comprising a condenser water vapor input port, a heat exchanging portion adapted to receive water vapor, a condenser condensed water output port;

a vacuum-rated manifold chamber (hereinafter manifold chamber), wherein the manifold chamber comprises a first manifold chamber liquid output port formed into a first side section of the manifold chamber that is coupled with the boiler chamber liquid input port by the first conduit, a first manifold chamber liquid input port, a second manifold chamber liquid input port formed on a bottom section of the manifold chamber, a manifold water vapor input port formed on a top section of the manifold chamber and coupled with the boiler water vapor output port by the first vapor conduit, a manifold water vapor output port formed into said top section of the manifold chamber and is coupled with the condenser water vapor input port by the second vapor conduit, an intake section or port formed into a second side section of the manifold chamber, a float valve coupled with the intake section or port that selectively controls flow of said first section water into the manifold chamber through the intake port or section, wherein the float valve maintains a predetermined water level within the manifold chamber;

a vacuum pump that is coupled with the first chamber;

a potable water storage system coupled to said condenser condensed water output port of said condenser-heat exchanger that collects condensed potable water from the condenser-heat exchanger;

a potable water pump system coupled with the potable water storage system and a potable water output and transfer conduit coupled with the pump that transfers potable water from the potable water storage system;

a first and second wastewater valves each coupled with a wastewater conduit that is coupled with the boiler chamber waste water output port;

a first and second circulation control valves, each respectively coupled with a first and second bottom section of the manifold chamber;

a first storage tank comprising a first refill valve and a first purge valve that are respectively disposed in the first storage tank such that said first purge valve is lower than said first refill valve, wherein the first refill valve is configured to selectively admit said first section water into the first storage tank and the first purge valve selectively enables an initial fill of said first storage tank with said first section water and later purging of wastewater accumulated in the first storage tank to be selectively purged from the first storage tank, wherein the first storage tank is selectively coupled with the first manifold chamber liquid input port via the first circulation valve, wherein the first storage tank is further selectively and fluidly coupled with the first wastewater valve, wherein the first storage tank further comprises a first internal wastewater conduit that is coupled with the first wastewater valve and extends into the first storage tank down to a bottom portion of the first storage tank to dispose higher density wastewater below lower density first section water in the first storage tank and so facilitate passage of the lower density first section water in the first storage tank to pass through the first circulation control valve and into the manifold chamber as higher density wastewater is passed into the bottom section of the first storage tank and thereby acts as a liquid piston as the higher density wastewater pushes the lower density first section water out of the second storage tank until the first storage tank is substantially filled with higher density wastewater and then the first circulation valve and the first wastewater valve are closed and the first purge and first refill valve are opened and thereby switch the first storage tank to a first storage tank water exchange mode from a first storage water manifold chamber feed mode until the higher density wastewater is exchanged out of the first storage tank by force of gravity drawing the higher density wastewater out of the first storage tank and said first section waster is drawn into the first storage chamber as the higher density wastewater is drawn out of the first storage tank, wherein said first storage tank is switched to the first storage tank water manifold feed mode when a predetermined amount of said wastewater is exchanged out of the first storage tank whereupon said first circulation valve and the first wastewater valve are opened and the first purge and first refill valve are closed and thereby switch the first storage tank from the first storage tank water exchange mode to the first storage water manifold chamber feed mode;

a second storage tank comprising a second refill valve and a second purge valve that are respectively disposed in the second storage tank such that said second purge valve is lower than said second refill valve, wherein the second refill valve is configured to selectively admit said first section water into the second storage tank and the second purge valve selectively enables an initial fill of said second storage tank with said first section water and later purging of wastewater accumulated in the second storage tank to be selectively purged from the second storage tank, wherein the second storage tank is selectively coupled with the second manifold chamber liquid input port via the second circulation valve, wherein the second storage tank is further selectively and fluidly coupled with the second wastewater valve, wherein the second storage tank further comprises a second internal wastewater conduit that is coupled with the second wastewater valve and extends into the second storage tank down to a bottom portion of the second storage tank to dispose higher density wastewater below lower first section density water in the second storage tank and so facilitate passage of the lower density first section water in the second storage tank to pass through said second circulation control valve and into the manifold chamber as higher density wastewater is passed into the bottom section of the second storage tank and thereby acts as another liquid piston as the wastewater pushes the lower density first section water out of the second storage tank until the second storage tank is substantially filled with wastewater and then the second circulation valve and the second wastewater valve are closed and the second purge and second refill valve are opened and thereby switch the second storage tank to a second storage tank water exchange mode from a second storage water manifold chamber feed mode until the higher density wastewater is exchanged out of the second storage tank by force of gravity drawing the higher density wastewater out of the second storage tank and said first section waster is drawn into the second storage chamber as the higher density wastewater is drawn out of the second storage tank, wherein said second storage tank is switched to the second storage tank water manifold feed mode when a predetermined amount of said wastewater is exchanged out of the second storage tank whereupon said second circulation valve and the second wastewater valve are opened and the second purge and second refill valve are closed and thereby switch the second storage tank from the second storage tank water exchange mode to the second storage water manifold chamber feed mode;

disposing the system for purifying or desalinating non-potable body of water except for the condenser-heat exchanger within the first section of water, wherein the manifold chamber is disposed substantially level with the first chamber and above the second and third storage tanks;

disposing said condenser-heat exchanger at a selected depth within said second section of water;

configuring and operating said first and second refill and first and second purge valves so that a first portion of said first section of water is drawn into said first storage tank and a second portion of said first section of water is drawn into said second storage tank then closing the first and second refill and first and second purge valves;

opening either the first recirculation valve and the first wastewater valve or the second recirculation valve and the second wastewater valve then and operating the float valve to pass first section water into the manifold chamber and thereby pass first section water into the first chamber;

establishing a first partial vacuum in the first chamber using the vacuum pump, vacuum conduit and valve, wherein the first partial vacuum is less than or equal to a vapor pressure of the first section of water after it is input into the first chamber, wherein said first partial vacuum is further determined based on a first temperature and salinity of the first section of water that will cause boiling of said first section of water within the first chamber resulting in a quantity of water vapor within the first chamber and thereby produce said higher density waste water in said first chamber that flows out of the first chamber and into either the first or second storage chamber based on configuration of the first or second wastewater valves, wherein said first or said second portion of first section of water enters said manifold chamber as said first or second portion of first section of water is forced out of said first or second storage tank by an equal portion of higher-density and higher salinity, non-potable wastewater as it enters said bottom portion of said first or second storage tank from said first chamber;

conveying or transporting said water vapor away from said first chamber into said manifold chamber then to the boiler heat exchange due to difference in pressure due to condensation of the water vapor in the condenser-heat exchanger;

producing condensed water from the water vapor, using the condenser-heat exchanger disposed within the second temperature water that is coupled with the first chamber by passing the water vapor through the condenser-heat exchanger from the first chamber by creation of a pressure differential between an internal section of the condenser-heat exchanger and the first chamber based on employing said condenser-heat exchanger to lower the water vapor's temperature sufficiently to create said pressure differential and achieve condensation of said water vapor within the condenser-heat exchanger so as to produce said condensed water;

capturing said condensed water from within the condenser-heat exchanger;

storing said condensed water as potable water in a potable water storage system;

monitoring system desalinization efficiency based on monitoring a rate of potable water production to identify a first or second storage tank waste water exchange mode trigger condition indicating a level of said higher-density and higher salinity, non-potable wastewater within the first chamber exceeds the first chamber's boiler-heat exchanger ability to vaporize said mixture under said first partial vacuum condition; and purging said higher density and higher salinity non potable waste water from the first or second storage tank and refilling said first or second storage tank with first section water and thereby reestablishing system efficiency or operation when said first or second storage tank waste water exchange mode trigger condition is determined then closing either the first recirculation valve and first wastewater valve then opening the first purge valve and first refill valve or closing the second recirculation valve and first wastewater valve and then opening the second purge valve and the second refill valve so as to cause said first section water in either the first or second storage tank to enter said manifold chamber as said first section water is forced out of said first or second storage tank by an equal portion of higher-density and higher-salinity, non-potable water entering said second storage tank from said first chamber.

7. A method as in claim 6, further comprising transferring said potable water to a second storage system spaced apart from said potable water storage system or distributing said potable water to a consumer.

8. A method for purifying or desalinating water utilizing naturally occurring temperature gradients, comprising the steps of:

identifying a non-potable body of water having temperatures decreasing with depth comprising a first section of water having a first temperature near a surface of said body of water and a second section of water underneath said first section of water with a second temperature that is at least a condensation temperature required to condense water from water vapor at said first temperature, wherein said first temperature is higher than said second temperature;

providing a vacuum-rated first chamber, a vacuum-rated second chamber, a gas or water vapor transfer structure coupling the first and second vacuum-rated chambers, a condenser-heat exchanger within said second chamber, a first pump coupled with the first vacuum-rated chamber, a first piping coupled with the first pump, a second pump coupled with the condenser-heat exchanger, and second piping coupled to the second pump, wherein the second piping comprises an intake and a discharge piping section, wherein said second piping and said second pump is configured to draw said second temperature water from said second section of water, through said condenser-heat exchanger, and discharges said second section water at a selected depth from said discharge section disposed at less than a depth of the intake section, a portion of said discharge section being a larger diameter than a portion of said intake piping section, wherein the intake section of the second piping includes a portion disposed within and passing from the discharge section but extending to a greater depth than a terminal end of said discharge section, wherein the first piping includes a first piping intake section disposed within the first section water so as to transport a quantity of first section water up a column of said quantity of first section water within the first vacuum-rated chamber to a spray nozzle disposed within said first chamber;

providing a submergence system comprising a support structure, a control system, motors, pumps, buoyancy tanks and an anchoring system, wherein said buoyancy tanks are coupled with said first and second chamber, said submergence system is adapted for submerging and raising said first and second chambers above or below said non-potable body of water;

providing a potable water storage system;

disposing said first chamber in or in proximity to said first section of water with a quantity of said first section of water within said first chamber, wherein a portion of the first chamber facing away from the first section of water is elevated above or facing away from the first section of water;

determining a vapor pressure for said first section of water disposing and positioning said second chamber in or in proximity to said first section of water, and providing an initial portion of potable water within the second chamber;

establishing a first partial vacuum in said first chamber less than or equal to a vapor pressure of said first section of water disposed in said first chamber, and exposing said quantity of said first section water to said first partial vacuum within said first chamber so as to achieve boiling of said quantity of first section water, resulting in a quantity of water vapor, wherein said establishing said first partial vacuum is produced by steps including raising said first chamber from a first elevation with respect to a surrounding surface of said body of water to a second elevation thereby establishing said first partial vacuum by positioning said first chamber to apply a first force from gravity on said quantity of first section water within the first chamber and thereby establishing a column of said quantity of first section water topped with said first partial vacuum at a top section inside said first chamber less than or equal to the vapor pressure of the quantity of first section water in said first chamber, wherein said establishing a first partial vacuum in said first chamber includes operating the first pump to transport the quantity of first section water up said column of said quantity of first section water to the spray nozzle disposed within said first chamber within said first partial vacuum, and dispersing portions of said quantity of first section water as a quantity of droplets within said top section of the first chamber;

passing a second temperature water drawn from said second section of water through the condenser-heat exchanger, wherein said condenser-heat exchanger is exposed to said second temperature water by said second pump to draw said second temperature water from said second section of water;

transporting the water vapor from the first chamber after the first partial vacuum is achieved in the first chamber and the second temperature water is passed through the condenser-heat exchanger thereby creating a pressure differential between the first and second chambers causing the water vapor from the first chamber to come into contact with said condenser-heat exchanger, wherein said condenser-heat exchanger lowers the water vapor's temperature and pressure in the second chamber to create said pressure differential and achieve condensation of said water vapor so as to produce condensed water;

capturing said condensed water resulting in a quantity of potable water;

storing said condensed water as potable water in said potable water storage system;

selectively reducing said submergence system's buoyancy to lower the support structure below the surface of the non-potable body of water; and selectively evacuating any non-potable water from said second chamber and returning conditions in said second chamber to said second partial vacuum.

* * * * *